July 17, 1951   D. G. TILTON   2,561,077
RADIATION PYROMETER
Filed April 4, 1946
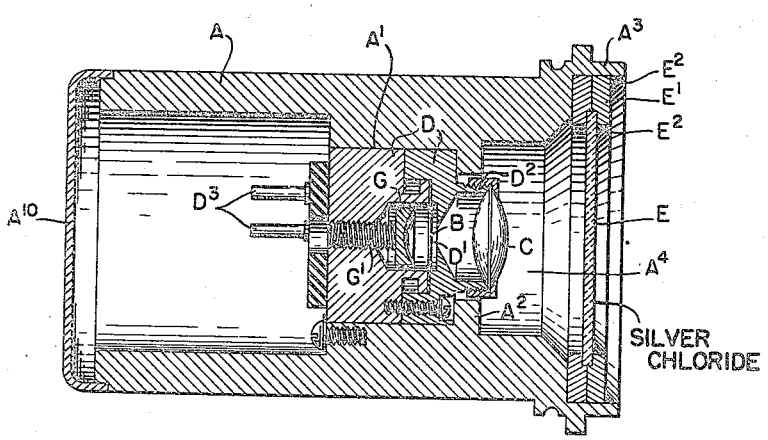
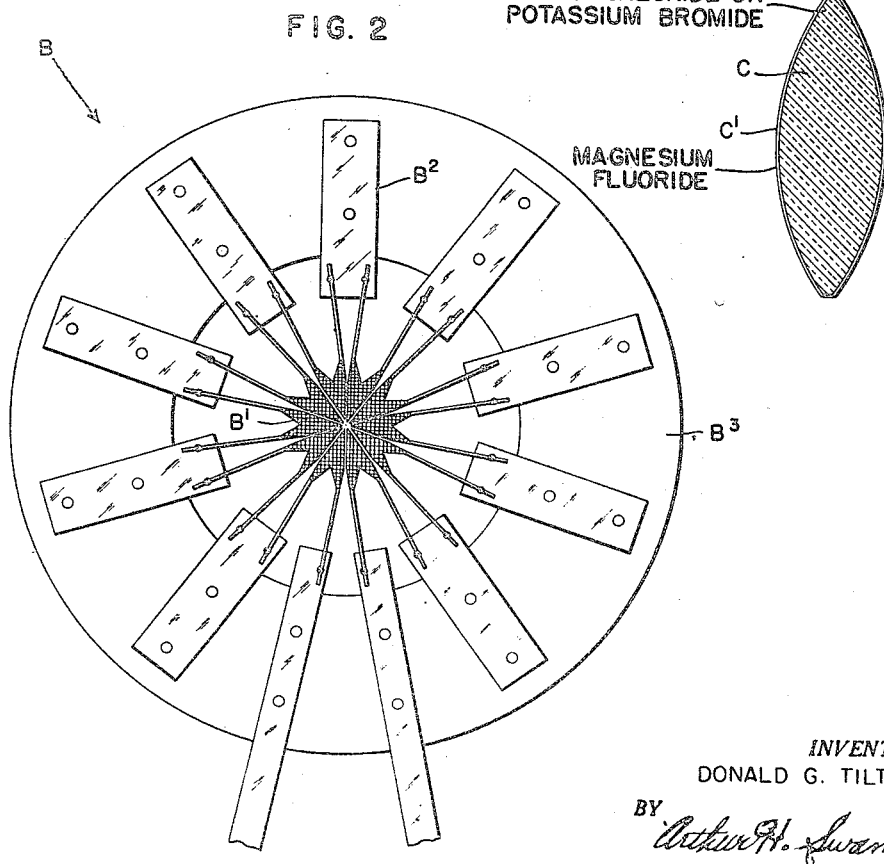
INVENTOR.
DONALD G. TILTON
BY Arthur H. Swanson
ATTORNEY.

Patented July 17, 1951

2,561,077

UNITED STATES PATENT OFFICE 2,561,077

RADIATION PYROMETER

Donald G. Tilton, St. Petersburg, Fla., assignor, by mesne assignments, to Minneapolis-Honeywell Regulator Company, Minneapolis, Minn., a corporation of Delaware Application April 4, 1946, Serial No. 659,573

2 Claims. (Cl. 136—4)

The general object of the present invention is to provide radiation pyrometry improvements primarily devised and adapted for use in measuring temperatures in the relatively low temperature range of 0° F. to 200° F., although some features of the invention may be used with advantage in measuring higher temperatures.

A primary object of the present invention is to provide improved means for the transmission of radiant heat to the receiving element of a pyrometer from a body at a relatively low temperature, and the invention comprises means for protecting the lens of such a pyrometer from contact with a humid atmosphere, and means for augmenting the effect on the radiation receiving element, of radiant energy passing to the pyrometer from the body whose temperature is to be measured.

It is practically essential that a radiation pyrometer intended for ordinary commercial use should include a focusing lens to direct to the radiation receiver of the pyrometer, heat rays emitted by the body whose temperature is to be measured. The material practically usable in such a lens depends on the wave lengths of the radiant energy to be transmitted. In measuring the temperatures of bodies at furnace temperatures, i. e., at temperatures from 800° F. to 3000° F., or higher, the lens may well be made of fused silica or Pyrex glass. In measuring more moderate temperatures varying from 212° F. up to 500° F. or so, the lens material may well be calcium fluoride or lithium fluoride. Those fluorides, as well as fused silica and Pyrex glass, are materials from which lenses can be readily formed, and which are not subject to injurious attack by ordinary atmospheric humidity. That is not the case, however, of materials practically usable in lenses adapted to pass a suitably high percentage of the radiant energy emitted by a body at a temperature in the range of 0° F. to 200° F. In a preferred radiation pyrometer embodiment adapted to measure temperatures in the range of 0° F. to 200° F., the predominant portion of the energy of the radiant energy emitted by a source at a temperature in that range is present in wavelengths between ten and twenty microns.

For the transmission of such energy, the best, and indeed the only practically usable, lens materials now known to me are sodium chloride and potassium bromide. Each of those materials deteriorates rapidly when in contact with atmospheric air having the humidity content of ordinary room atmospheres. I have discovered, however, that it is practically feasible to protect a lens formed of sodium chloride or potassium bromide from attack by atmospheric humidity, by giving the lens a waterproof coating as hereinafter described, or by mounting the lens in a pyrometer chamber sealed against the admission of the external atmosphere and having a window of material suitably immune to attack by atmospheric humidity and adapted to transmit radiant energy of the wave lengths emitted by the body whose temperature is to be measured.

For satisfactory results, the lens coating material employed must be adapted to form an adherent film on the lens which will not develop cracks or fissures during a suitably prolonged operative life, and which will not permit the passage of moisture to the lens body, and which will transmit to the lens body an adequately large percentage of the incident radiation from a body at a temperature of from about 0° F. to about 200° F. The only practically available coating material for such use now known to me is magnesium fluoride. In practice, I waterproof a lens formed of sodium chloride or potassium bromide, by evaporating magnesium fluoride to create a lens contacting atmosphere containing magnesium fluoride vapor with the resultant formation of a condensed film of magnesium fluoride on the lens.

In some cases, I apply to a lens coated with magnesium fluoride, a second waterproof coating of liquid polystyrene, lacquer or similar material. Lacquer or a coating of liquid polystyrene applied directly to a lens will waterproof the latter, but those materials, when directly applied to the lens, are not as adherent as is the magnesium fluoride lens coating, or as adherent as a coating of lacquer or liquid polystyrene covering a previously applied magnesium fluoride coating on the lens. Furthermore, the directly applied coating of lacquer or polystyrene tends to crack and separate from the lens, and to form a mosaic pattern thereon.

The magnesium fluoride lens coating with or without the second coating of lacquer or liquid polystyrene has a chemical resistant as well as a waterproofing lens protecting action.

While the application of a coating of lacquer, or liquid polystyrene, or similar material to a lens previously coated with magnesium fluoride increases the effectiveness of the waterproofing, the second coating somewhat reduces the efficiency of transmission of radiant energy in the wave length band to be transmitted. For optimum results, I have found that the magnesium fluoride lens coating film should have a thickness of ¼ of the wave length of light in the sodium band, when the lens is at a temperature of approximately 200° F. when coated.

In protecting a pyrometer lens against atmospheric humidity by locating the lens in a closed pyrometer chamber having a window transparent to the radiation to be transmitted by the lens, the only available window material now known to me is silver chloride. The use of a silver chloride window protects the lens not only from atmospheric humidity, but also from dust and dirt which would impair the lens transparency. Dirt or dust accumulating on the outer surfaces of the silver chloride window can be rubbed off without injuring the window, but dirt or dust cannot be rubbed off an uncoated sodium chloride or potassium bromide lens without risk of injury to the lens. The described use of a lens enclosure including a silver chloride window is open to the disadvantage that it is difficult to prevent the slow leakage of atmospheric humidity into the lens enclosure. Furthermore, if the lens is not provided with a waterproof coating during the period in which it is being shaped and polished, some deterioration may be expected.

Of the accompany drawings:

Fig. 1 is a sectional elevation of a pyrometer including a lens protected against atmospheric humidity;

Fig. 2 is an elevation of a thermopile included in the pyrometer shown in Fig. 1; and Fig. 3 is a central section through a coated pyrometer lens.

In Fig. 1, I have shown, by way of example, a pyrometer including a relatively massive hollow body or housing A of metal having good heat conductivity and in which are mounted a radiation receiving element B and a lens C focused on the central portion of the radiation receiving element. The lens C is thus adapted to transmit to the element B a relatively large amount of the radiant energy emitted by a body (not shown) which is directly in front of, and suitably close to the lens. As shown, the element B is secured in a relatively massive two part metallic holder D mounted in a seat A' including a portion of the cylindrical inner wall of the housing A and including an annular end portion formed by an internal circumferential flange portion A² of the housing A.

While the radiation receiving element B may take various forms, and in particular may be a bolometer resistance bridge, or a thermopile of various forms, it is advantageously a thermopile of the known form shown in Fig. 2. As there shown, the thermopile B comprises ten V shaped thermocouples B' having their apices spaced around and in close proximity to the pyrometer axis. The two outer terminal or leg portions of each thermocouple are in the form of relatively short wires each connected to a different one of eleven metal strips B². The latter are spaced radially at regular intervals around the pyrometer axis and may be formed of constantan and fastened to a mica sheet B³ in the form of an annulus and constituting a supporting part of the thermopile terminal assembly. The strips B² are secured to the mica sheet B³ by flattened-over extrusions formed in the strips B² and extending through suitable openings provided in the mica sheet B³. The apex portions of the different thermocouples B' are flattened and collectively form the hot junctions or radiation receiving portion of the thermopile. The flattened hot junction portions of the thermocouples are blackened with aquadag and smoked or coated with lamp black to provide a surface which will readily absorb substantially all of the incident radiation. The terminal portion of the thermopile B is clamped between the adjacent surfaces of the separable front and rear portions of the holder D, thin sheets of mica being interposed between each of said surfaces and the adjacent side of the thermopile terminal assembly.

In so far as above described, the pyrometer structure shown in Figs. 1 and 2 does not differ from the pyrometer structure shown and described in the prior Harrison Patent 2,357,193 of August 29, 1944. In particular, it is to be noted that the thermopile shown herein, is like that of said prior patent in that the thermocouple terminal wire portions are relatively short and are so chosen as to provide a desirable and relatively high conduction factor, and that the parts are so proportioned and arranged as to insure continuous temperature equality between the flat cold junction strip B² and the pyrometer housing or body structure A. The latter by reason of its relative massive form and the good thermal conductivity of the metal of which it is composed, has all portions in proximity to the thermopile substantially uniform in temperature at all times. In consequence, the hot junctions of the thermopiles, as well as the cold junctions thereof, will respond completely to changes in the temperature of the housing body A with such rapidity as to make negligible transient errors occurring while the housing A is undergoing a change of temperature. As in said prior patent, the hot junction portion or radiation receiving portion of the thermopile is located in a relatively small chamber D' formed in the holder D and open at one side to receive the heat rays received through the front end of the chambered body A and transmitted through the lens C to the thermopile.

As shown in Fig. 1, the lens C is mounted in an annular portion D² of the holder D, but the lens may be separately mounted in the pyrometer housing or body structure. In general, it is practically desirable, however, that the lens mounting should be in good heat conducting relation with the housing body A. As in said prior Harrison patent, the holder D supports binding posts D³ respectively connected to the metal plates B², which, as shown in Fig. 2, are each connected to one only of the thermocouples B'. The binding posts D³ are received in the chamber space at the rear of the holder D to which access is made possible on the removal of the housing end member A¹⁰ detachably connected to the housing body A.

As previously explained, for use in measuring temperatures in the neighborhood of 200° F. and lower, it is essential that the lens should be formed of material adapted to transmit a suitably large portion of radiation emitted by a body at a temperature within said range. Sodium chloride and potassium bromide are the only lens materials suitable for such use, which are now known to me. Neither of those materials is mechanically strong, and each is subject to rapid and severe deterioration when exposed in a humid atmosphere. In the preferred form of the present invention illustrated in Fig. 3, the convex lens body C has a coating C' of magnesium fluoride. My practice in applying that coating is to place the lens in an evacuated container along with a vessel containing magnesium fluoride and electric heating means for evaporating the magnesium fluoride, and thereby enveloping the lens in a magnesium fluoride vapor atmosphere. Magnesium fluoride condensing out of said atmosphere onto the surface of the lens, forms an adherent film or coating of suitable and suitably uniform thickness. Suitable care should be taken to avoid risk of objectionable deterioration due to atmospheric humidity during the period in which the lens is being fashioned and polished. To this end, during the periods in which one side of the lens is being worked on, the other side of the lens is advantageously protected by a coating of lacquer or liquid polystyrene. When thereafter the lens is to be coated with magnesium fluoride, it is dipped in a solution for thinning and removing the lacquer or liquid polystyrene coating before being placed in the chamber in which magnesium fluoride is to be evaporated.

After the lens has been coated with magnesium fluoride, it may be given further protection, in some cases, by giving it a second coating of lacquer or liquid polystyrene. Lacquer or liquid polystyrene adheres well to a lens coated with magnesium fluoride, though, as previously stated, each of said second coating materials is inadequately adherent when applied directly to a sodium chloride or potassium bromide lens.

In lieu of, or in addition to protection of the lens C which is obtained by coating the lens with magnesium fluoride, or by coating it successively with magnesium fluoride and with lacquer or liquid polystyrene, the lens may be protected by locating it in an enclosed chamber having a window suitably transparent to the heat rays to be transmitted through the lens to the radiation receiver B.

As shown in Fig. 1, such an enclosure and a window are formed by anchoring the rim E' surrounding and attached to the peripheral portion of a window pane E in a recessed seat A³ formed in the front end portion of the housing body A. The joints between the window pane E and the rim E', and between the latter and the housing body are sealed as indicated at E² to prevent the leakage of atmospheric air into the space A⁴ between the lens C and the window A. The window pane E which I have used is a flat disc or plate of silver chloride, which adequately transmits radiation emitted by a body at a temperature within the range of 0° F. to 200° F.

Unless and until leakage into the chamber space A⁴ occurs, the lens C will be protected against the deteriorating effect of atmospheric humidity even though it has no waterproof coating. However, the coating of the lens C has the practical advantage in all cases of providing needed protection for the lens while the latter is being inspected and handled in the course of and preparatory to its mounting in the pyrometer. Aside from its protection against atmospheric humidity, the window pane E provides protection against the possibility of dirt and dust adherence to the lens. Dust and dirt adhering to the outer surface of the silver chloride pane E may be wiped off without damage, whereas dirt and dust cannot be wiped off a lens formed of sodium chloride or potassium bromide, without risk of injury to the lens, even though the latter has a magnesium fluoride coating.

To augment the effect of the relatively small amount of radiant energy transmitted to the radiation receiving element B from a body at a relatively low temperature, I advantageously coat the rear side, as well as the front side, of the radiation receiver with the colloidal suspension of graphite known as aquadag, and smoke or otherwise coat both sides with lamp black, and place a mirror G in position to return to the central portion of the thermopile, radiation emitted by the rear side of the receiver and radiation passing through the narrow air spaces between the thermocouples. As shown, the mirror G has a threaded stem G' extending through a threaded axial passage in the rear portion of the holder D. The mirror can thus be adjusted into the proper focal relation with the rear side of the thermopile by rotation of its stem. The use of the mirror G in a radiation pyrometer as shown and described herein, may be used with advantage in measuring temperatures substantially higher than 200° F., as well as in measuring low temperatures.

In measuring relatively low temperatures with a radiation pyrometer of the general type shown in said prior patent, it has been found advantageous to thermostatically regulate the temperature of the pyrometer housing as required to maintain the housing temperature at a constant temperature higher than the ambient temperature, or to maintain the temperature of the housing equal to the temperature of the hot body whose temperature is to be measured. Such regulation of the pyrometer housing temperature avoids or minimizes measurement errors due to ambient temperature variations. While such pyrometer housing temperature regulation may advantageously be employed in pyrometers in which use is made of the present invention, such regulation did not originate with me and is not claimed herein.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent is:

1. A radiation pyrometer for measuring relatively low temperatures of the order of 0° F. to 200° F. comprising a heat responsive device and a lens transmitting radiant energy to said device and formed of a material in the group of materials consisting of sodium chloride and potassium bromide which deteriorate when in contact with a humid atmosphere, said lens having a transparent coating of magnesium fluoride thereon for protecting the lens from the ambient atmosphere.

2. A pyrometer as specified in claim 1 including a second coating of waterproof material covering said magnesium fluoride coating and formed of material transparent to said radiant energy.

DONALD G. TILTON.

(References on following page)

REFERENCES CITED

The following references are of record in the file of this patent:

UNITED STATES PATENTS

| Number | Name | Date |
|---|---|---|
| 1,541,407 | Spangenberg | June 9, 1925 |
| 1,788,849 | Schunemann | Jan. 13, 1931 |
| 2,085,437 | Michelssen | June 29, 1937 |
| 2,207,656 | Cartwright et al. | July 9, 1940 |
| 2,398,382 | Lyon | Apr. 16, 1946 |
| 2,415,352 | Iams | Feb. 4, 1947 |
| 2,422,273 | Wannamaker | June 17, 1947 |

FOREIGN PATENTS

| Number | Country | Date |
|---|---|---|
| 538,301 | Great Britain | July 28, 1941 |

OTHER REFERENCES

Hardy, J., Clinical Investigation, vol. 13 (1934), pages 596, 597.

Hershey, A. E., Trans. A. S. M. E., vol. 58 (1936), page 197.

Fugassi et al., Rev. Sc. Insts., vol. 13 (1942), pages 335-6.

Strong, J., Procedures in Experimental Physics (1942), page 365.

Harrison, J., Opt. Soc. Am., November 1945, page 713.